(12) United States Patent
Yang et al.

(10) Patent No.: US 10,711,165 B2
(45) Date of Patent: Jul. 14, 2020

(54) AQUEOUS ADHESIVE COMPOSITION

(71) Applicant: Rohm and Haas Company, Philadelphia, PA (US)

(72) Inventors: Miao Yang, Shanghai (CN); Yin Xue, Shanghai (CN)

(73) Assignee: Rohm and Haas Company, Collegeville, PA (US)

( * ) Notice: Subject to any disclaimer, the term of this patent is extended or adjusted under 35 U.S.C. 154(b) by 0 days.

(21) Appl. No.: 15/120,659

(22) PCT Filed: Mar. 11, 2014

(86) PCT No.: PCT/CN2014/073173
§ 371 (c)(1),
(2) Date: Aug. 22, 2016

(87) PCT Pub. No.: WO2015/135122
PCT Pub. Date: Sep. 17, 2015

(65) Prior Publication Data
US 2017/0015879 A1    Jan. 19, 2017

(51) Int. Cl.
*C09J 133/08*    (2006.01)

(52) U.S. Cl.
CPC .................................. *C09J 133/08* (2013.01)

(58) Field of Classification Search
CPC ....................................................... C09J 133/00

USPC .......................................................... 524/561
See application file for complete search history.

(56) References Cited

U.S. PATENT DOCUMENTS

| | | | |
|---|---|---|---|
| 2010/0051200 A1 | 3/2010 | Mueller et al. | |
| 2013/0065070 A1 | 3/2013 | Nabuurs et al. | |
| 2014/0058031 A1 | 2/2014 | Overbeek et al. | |

FOREIGN PATENT DOCUMENTS

| | | | | |
|---|---|---|---|---|
| CN | 103059784 A | * | 4/2013 | |
| DE | 102009055019 A1 | | 6/2011 | |
| EP | 2298846 A1 | * | 3/2011 | .......... C09J 133/064 |
| GB | 651355 A | | 3/1951 | |
| GB | 652057 A | | 4/1951 | |
| GB | 666990 A | | 2/1952 | |
| GB | 683465 A | | 11/1952 | |
| GB | 1254226 A | | 11/1971 | |
| JP | 61171775 A | * | 8/1986 | |
| WO | WO-2011073041 A1 | * | 6/2011 | .......... C09J 133/066 |
| WO | 2013113937 A1 | | 8/2013 | |

* cited by examiner

*Primary Examiner* — Kelechi C Egwim

(57) ABSTRACT

Provided is an aqueous adhesive composition comprising a polymer that comprises (a) polymerized units of one or more alkyl (meth)acrylate monomer, (b) polymerized units of acrylic acid or methacrylic acid or a mixture thereof, (c) polymerized units of one or more dialkyl diester of itaconic acid, and (d) polymerized units of one or more other monomer.

7 Claims, No Drawings

AQUEOUS ADHESIVE COMPOSITION

Adhesive compositions are useful for a wide variety of purposes. One useful class of adhesive compositions is pressure sensitive adhesives (PSAs). It would be desirable if a PSA had both a high value of tack and also had excellent shear performance. However, in the past, it has generally been observed that when a PSA had high tack, it had less than desirable shear performance.

US 2013/0065070 describes an aqueous emulsion that contains a vinyl polymer obtainable from itaconate ester monomers, a process for making such aqueous emulsion, a coating obtained from the aqueous emulsion, and the coated substrate. The vinyl polymer disclosed by US 2013/0065070 contains 45 to 99 wt % of itaconate ester monomers. It is desired to provide an adhesive composition that maintains an acceptable level of shear performance and that has increased value of tack. It is also desired to use such an adhesive composition to bond substrates together.

The following is a statement of the present invention.

The first aspect of the present invention is an aqueous adhesive composition comprising a polymer that comprises
 (a) 80% to 99% by weight, based on the dry weight of said polymer, polymerized units of one or more alkyl (meth) acrylate monomer,
 (b) 0.1% to 10% by weight, based on the dry weight of said polymer, polymerized units of acrylic acid or methacrylic acid or a mixture thereof,
 (c) 0.1% to 15% by weight, based on the dry weight of said polymer, polymerized units of one or more dialkyl diester of itaconic acid, and
 (d) 0% to 20% by weight, based on the dry weight of said polymer, polymerized units of one or more other monomer.

The second aspect of the present invention is a method of bonding substrates together comprising
 (A) applying a layer of an aqueous adhesive composition to a first substrate,
 (B) drying said layer of said aqueous adhesive composition to produce a dried adhesive layer,
 (C) contacting said dried adhesive layer with a second substrate;
 wherein said adhesive composition comprises a polymer comprising
 (a) polymerized units of one or more alkyl (meth)acrylate monomer,
 (b) polymerized units of acrylic acid or methacrylic acid or a mixture thereof,
 (c) polymerized units of one or more dialkyl diester of itaconic acid, and
 (d) optionally, polymerized units of one or more other monomer.

The following is a detailed description of the invention.

As used herein, the following terms have the designated definitions, unless the context clearly indicates otherwise.

The glass transition temperature (Tg) of a material is determined by differential scanning calorimetry using the midpoint method and temperature scan rate of 10° C. per minute according to test method ASTM D7426-08 (American Society of Testing and Materials, Conshohocken, Pa., USA).

A "polymer," as used herein is a relatively large molecule made up of the reaction products of smaller chemical repeat units. Polymers may have structures that are linear, branched, star shaped, looped, hyperbranched, crosslinked, or a combination thereof; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof.

Polymer molecular weights can be measured by standard methods such as, for example, size exclusion chromatography (SEC, also called gel permeation chromatography or GPC). Polymers have weight-average molecular weight (Mw) of 1000 or more. Polymers may have extremely high Mw; some polymers have Mw above 1,000,000; typical polymers have Mw of 1,000,000 or less. Some polymers are crosslinked, and crosslinked polymers are considered to have infinite Mw.

Gel content and degree of swelling (DS) of a polymer are defined as follows:

$$\text{Gel Content} = \left(\frac{W_2}{W_0}\right) \times 100\%$$

$$DS = \frac{W_1 - W_2}{W_2}$$

Where $W_0$ is the dry weight of the polymer, prior to conducting the test for gel content; $W_1$ is weight of the polymer after immersion in methyl ethyl ketone in an amount 150 times by weight of the dry weight of the polymer at 30° C. for 24 hours; and $W_2$ is the weight of the completely dried swollen polymer.

As used herein "weight of polymer" means the dry weight of polymer.

Molecules that can react with each other to form the repeat units of a polymer are known herein as "monomers." The repeat units so formed are known herein as "polymerized units" of the monomer.

Vinyl monomers have the structure I

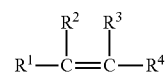

where each of $R^1$, $R^2$, $R^3$, and $R^4$ is, independently, a hydrogen, a halogen, an aliphatic group (such as, for example, an alkyl group), a substituted aliphatic group, an aryl group, a substituted aryl group, another substituted or unsubstituted organic group, or any combination thereof.

Vinyl monomers include, for example, styrene, substituted styrenes, dienes, ethylene, other alkenes, dienes, ethylene derivatives, and mixtures thereof. Ethylene derivatives include, for example, unsubstituted or substituted versions of the following: ethenyl esters of substituted or unsubstituted alkanoic acids (including, for example, vinyl acetate and vinyl neodecanoate), acrylonitrile, (meth)acrylic acids, (meth)acrylates, (meth)acrylamides, vinyl chloride, halogenated alkenes, and mixtures thereof. As used herein, "(meth)acrylic" means acrylic or methacrylic; "(meth)acrylate" means acrylate or methacrylate; and "(meth)acrylamide" means acrylamide or methacrylamide. "Substituted" means having at least one attached chemical group such as, for example, alkyl group, alkenyl group, vinyl group, hydroxyl group, carboxylic acid group, other functional groups, and combinations thereof. Substituted monomers include, for example, monomers with more than one carbon-carbon double bond, monomers with hydroxyl groups, monomers with other functional groups, and monomers with combinations of functional groups. (Meth)acrylates are substituted and unsubstituted esters or amides of (meth)acrylic acid.

As used herein, acrylic monomers are monomers selected from (meth)acrylic acid, aliphatic esters of (meth)acrylic acid, aliphatic esters of (meth)acrylic acid having one or more substituent on the aliphatic group, (meth)acrylamide, N-substituted (meth)acrylamide, and mixtures thereof.

As used herein, an "alkyl (meth)acrylate monomer" has the structure II

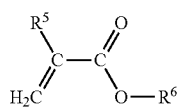

where $R^5$ is hydrogen or methyl, and $R^6$ is an alkyl group. As used herein, an "alkyl acrylate monomer" has structure II in which $R^5$ is hydrogen. As used herein, an "alkyl methacrylate monomer" has structure II in which $R^5$ is methyl.

As used herein, a "dialkyl diester of itaconic acid" has the structure III

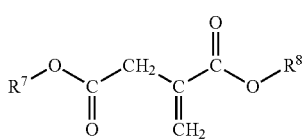

where each of $R^7$ and $R^8$ is an alkyl group having one or more carbon atom. $R^7$ and $R^8$ may be identical to each other or may be different from each other.

As used herein, an "acrylic" polymer is a polymer in which 30% or more of the polymerized units are selected from acrylic monomers and also in which 5% or more of the polymerized units are selected from the group consisting of acrylic monomers and vinylaromatic monomers. The percentages are by weight based on the weight of the polymer.

A tackifier is an organic compound having molecular weight of 500 to 10,000 and having glass transition temperature of 0° C. or higher.

A Pressure Sensitive Adhesive (PSA) is an adhesive that forms a bond with a substrate when pressure is applied to bring the adhesive and the substrate into contact. The bond forms without addition of further materials or the application of heat. As used herein, a pressure sensitive adhesive article is an article in which a pressure sensitive adhesive is adhered to a first substrate and in which a surface of the PSA (the "available surface") is available to make contact with a second substrate. The available surface of the PSA may or may not be in contact with a release material. A release material is a material that forms a weak bond with the PSA and may be easily removed so that the available surface is exposed.

A composition is herein considered to be "aqueous" if the composition contains water in the amount of 25% or more by weight based on the weight of the composition.

A polymer made by aqueous emulsion polymerization is known herein as a "latex" polymer. Latex polymers exist as particles distributed throughout a continuous aqueous medium.

A substance is said herein to be present in a "negligible amount" if the amount of that substance is less than 0.1% by weight based on the total weight of the composition of the present invention.

When it is stated herein that a substance is present in a composition at 0% to X %, it is meant that the substance is either absent entirely or, if present, is present in an amount of less than X %.

The composition of the present invention contains a polymer. Preferably, the polymer is present in the form of particles dispersed in a continuous liquid medium. Preferably, the amount of water in the continuous liquid medium is, by weight based on the weight of the continuous liquid medium, 50% or more; more preferably 75% or more; more preferably 85% or more. Preferably, the volume-average mean particle size of the polymer particles is 50 nm to 1,000 nm.

The polymer that is present in the present invention contains polymerized units of monomer (a). Monomer (a) is one or more alkyl (meth)acrylate monomer, the structure of which is shown in structure II above. Preferably, the polymer contains polymerized units of at least one alkyl acrylate monomer. Preferably, at least one alkyl acrylate monomer is used in which $R^6$ is an alkyl group having 4 or more carbon atoms. Preferably, the polymer contains polymerized units of butyl acrylate, 2-ethylhexyl acrylate, or a mixture thereof; more preferably the polymer contains polymerized units of butyl acrylate and polymerized units of 2-ethylhexyl acrylate. Preferably, the amount of polymerized units of monomer (a) is, by weight based on the dry weight of the polymer, 60% or more; more preferably 70% or more; more preferably 80% or more; 85% or more. Preferably, the amount of polymerized units of monomer (a) is, by weight based on the dry weight of the polymer, 95% or less.

Preferably, either the polymer contains no polymerized units of alkyl methacrylate monomer or else the polymer contains an amount of polymerized units of alkyl methacrylate monomer that is, by weight based on the dry weight of the polymer, 15% or less, more preferably 10% or less; more preferably 8% or less. Preferably, if an alkyl methacrylate is used, the alkyl methacrylate is one in which $R^6$ is an alkyl group having 3 or fewer carbon atoms. More preferably, if an alkyl methacrylate is used, the alkyl methacrylate is methyl methacrylate.

The polymer that is present in the present invention contains polymerized units of one or more monomer (b). Monomer (b) is acrylic acid, methacrylic acid, or a mixture thereof. Preferably, monomer (b) is acrylic acid. The amount of polymerized units of monomer (b) is, by weight based on the dry weight of the polymer, 0.1% or more; preferably 0.2% or more; more preferably 0.5% or more; more preferably 0.7% or more. The amount of polymerized units of monomer (b) is, by weight based on the dry weight of the polymer, 10% or less; preferably 5% or less; more preferably 2.5% or less.

The polymer that is present in the present invention contains polymerized units of monomer (c). Monomer (c) is one or more dialkyl diester of itaconic acid, the structure of which is shown in structure III above. Preferably, one or both of $R^7$ and $R^8$ is an alkyl group having 4 or more carbon atoms. Preferably, one or both of $R^7$ and $R^8$ is an alkyl group having 8 or fewer carbon atoms. Preferably, $R^7$ and $R^8$ are identical.

The amount of polymerized units of monomer (c) in the polymer is, by weight based on the dry weight of the polymer, 0.1% or more; preferably 1% or more; more preferably 2% or more; more preferably 5% or more. The amount of polymerized units of monomer (c) in the polymer is, by weight based on the dry weight of the polymer, 15% or less; preferably 12% or less; more preferably 10% or less.

The polymer that is present in the present invention optionally contains polymerized units of monomer (d). Monomer (d) is any monomer that is capable of forming a copolymer with monomers (a), (b), and (c) and that is different from all of monomers (a), (b), (c), and (d). When monomer (d) is present, monomer (d) may be, for example, styrene, vinyl acetate, (meth)acrylamide, substituted-alkyl (meth)acrylates, itaconic acid, alkyl monoesters of itaconic acid, and mixtures thereof. Preferably, the amount of polymerized units of monomer (d) is, by weight based on the weight of the dry polymer, 0% to 20%; more preferably 0% to 10%; more preferably 0% to 5%. More preferably, monomer (d) is absent.

Monomer (d) optionally contains one or more multiethylenically unsaturated monomer. Preferably, the amount of polymerized units of multiethylenically unsaturated monomer is 0% to 3%; more preferably 0% to 1%; more preferably 0% to 0.2%; more preferably 0%.

Preferably, the amount polymerized units of acrylonitrile in the polymer is either zero or a negligible amount; more preferably zero. Preferably, the amount polymerized units of hydrocarbon monomer in the polymer is either zero or a negligible amount; more preferably zero. Preferably, the amount polymerized units of halogenated monomer in the polymer is either zero or a negligible amount; more preferably zero. Preferably, the amount polymerized units of acrylamide in the polymer is either zero or a negligible amount; more preferably zero. Preferably, the amount polymerized units of alkoxy-substituted alkyl esters of (meth)acrylic acid in the polymer is either zero or a negligible amount; more preferably zero.

Monomer (d) optionally contains one or more lower-alkyl diester of itaconic acid. A lower-alkyl diester of itaconic acid has structure III above in which both of $R^7$ and $R^8$ are alkyl groups having 1 to 3 carbon atoms. Preferably, the amount of polymerized units of lower-alkyl diesters of itaconic acid, by weight based on the weight of the polymer, is 0% to 1%; more preferably 0% to 0.5%; more preferably 0% to 0.5%; more preferably 0% to 0.1%; more preferably 0%.

Monomer (d) optionally contains one or alkyl monoester of itaconic acid. An alkyl monoester of itaconic acid has structure III above in which one of $R^7$ and $R^8$ is hydrogen and the other is an alkyl group. Preferably, the amount of polymerized units of alkyl monoesters of itaconic acid, by weight based on the weight of the polymer, is 0% to 5%; more preferably 0% to 2%; more preferably 0% to 1%; more preferably 0% to 0.5%; more preferably 0%.

Preferably, the amounts of monomers (a), (b), (c), and (d), by weight based on the dry weight of the polymer, add up to 100%.

Preferably, the amount of polymer described above in the composition of the present invention is, by dry weight of the polymer based on the total weight of the composition, 20% or more; more preferably 30% or more; more preferably 40% or more. Preferably, the amount of polymer described above in the composition of the present invention is, by dry weight of the polymer based on the total weight of the composition, 60% or less.

Preferably, the gel content of the polymer is less than 80%; more preferably 75% or less; more preferably 50% or less; more preferably 25% or less. Preferably, the degree of swelling of the polymer is 16 or more; more preferably 20 or more; more preferably 30 or more. In the case where the polymer is completely soluble in the methyl ethyl ketone, the degree of swelling cannot be measured; in such a case, the degree of swelling is considered to be more than 100.

Preferably, the Tg of the polymer is 0° C. or less; more preferably −10° C. or less; more preferably −20° C. or less; more preferably −30° C. or less. Preferably, the Tg of the polymer is −100° C. or higher.

Preferably, the Mw of the polymer is 50,000 or higher; more preferably 70,000 or higher. Preferably, the Mw of the polymer is 1,000,000 or lower; more preferably 500,000 or lower; more preferably 300,000 or lower.

The composition of the present invention may be made by any method. Preferably, the polymer is made by a process of aqueous emulsion polymerization. Preferably the polymer is a latex polymer.

The composition of the present invention is useful as an adhesive composition. Preferably, the composition of the present invention is useful as a pressure sensitive adhesive composition. Preferably, when a layer of the composition of the present invention is applied to a substrate, after that layer of the composition is dried or allowed to dry, to produce a dried adhesive layer. Preferably, that dried adhesive layer is a pressure sensitive adhesive.

The composition of the present invention optionally contains one or more tackifier. In some embodiments (herein "no-tackifier" embodiments), the amount of tackifier is either zero or a negligible amount; more preferably zero. In other embodiments, (herein "with-tackifier" embodiments), the amount of tackifier, by weight based on the total weight of the composition, is preferably 0.5% or more; more preferably 1% or more. In with-tackifier embodiments, the amount of tackifier, by weight based on the total weight of the composition, is preferably 10% or less; more preferably 8% or less.

When a layer of the composition of the present invention is applied to a substrate, it may be dried by any method. For example, the layer may be allowed to dry at 25° C., optionally exposed to moving air. Preferably, heat is applied to the layer to speed up the evaporation of water.

Preferably the thickness of the dried adhesive layer of the present invention is 2 micrometers or more; more preferably 5 micrometers or more. Preferably the thickness of the dried adhesive layer of the present invention is 2 mm or less; more preferably 1 mm or less.

The composition of the present invention may be used to bond substrates in a variety of ways. Some exemplary embodiments are as follows.

In one embodiment (herein "embodiment I"), the composition of the present invention is applied to a release surface and dried. Then a second substrate is brought into contact with the dried adhesive layer, and preferably pressure is applied. In such embodiments, the second substrate is preferably either paper of plastic film. It is contemplated that the dried adhesive layer will adhere well to the second substrate. When the second substrate is a plastic film, the dried adhesive layer is preferably brought into contact with a surface of the film that had previously been treated to enhance adhesion, such as, for example, corona treatment or application of a primer. In such embodiments, the release surface is then removed, for example by peeling, and then the dried adhesive layer is brought into contact with a third substrate, and preferably pressure is applied. It is contemplated that the second substrate and the third substrate will be usefully bonded together by the dried adhesive layer.

Preferably, in embodiment I, the composition of the present invention contains no tackifier or a negligible amount of tackifier; more preferably in embodiment I the composition of the present invention contains no tackifier.

In another embodiment (herein "embodiment II"), the composition of the present invention is applied to a first substrate and dried. In embodiment II, the first substrate is the same as the second substrate in embodiment I. The dried adhesive layer is then brought into contact with a release layer. For example, the first substrate may be a plastic film that has a release surface on the side opposite the side in contact with the dried adhesive layer; and the first substrate, with the layer of the dried composition, may be rolled to form a tape. For another example, the first substrate may be paper, and the dried adhesive layer may be brought into contact with a release surface on a second substrate. It is contemplated that the release surface may be removed from contact with the dried adhesive layer, and the dried adhesive layer may then be brought into contact with a final substrate, to form a useful bond between the first substrate and the final substrate.

Preferably, in embodiment II, the composition of the present invention contains tackifier.

The following are examples of the present invention.

The following terms and abbreviations are used in the following examples.

BA=butyl acrylate
2-EHA=2-ethylhexyl acrylate
MMA=methyl methacrylate
DBI=dibutyl itaconate
APS=ammonium persulfate
NaPS=sodium persulfate
Latex1=acrylic latex, particle size is 100 nm, solids weight=45%
A-102=AEROSOL™ A-102 surfactant, monoester sulfosuccinates, from Cytec.
DS-4=RHODACAL™ DS-4 surfactant, sodium dodecylbenzene sulfonate, from Rhodia.
t-BHP=tert-butyl hydroperoxide
t-AHP=tert-amyl hydroperoxide
FINAT=Federation Internationale des fabricants et transformateurs d'Adhésifs et Thermocollants.
HDPE=high density polyethylene
SS=stainless steel
DT=Dwelling Time

EXAMPLE 1: SYNTHESIS OF SYNTHESIS OF INVENTIVE I

Monomer Emulsion: 2.52 g Sodium Carbonate was dissolved in 255 g deionized water (DI water). An emulsified monomer mixture was prepared by adding the following chemicals slowly to the agitated solution: 12.6 g Glacial Acrylic Acid, 8.85 g A-102, 15.19 g DS-4, 504 g 2-Ethyl-Hexyl Acrylate, 585.9 g Butyl Acrylate, 63 g Dibutyl Itaconate, and 94.5 g Methyl Methacrylate.

A solution containing 0.82 g Sodium Carbonate and 300 g deionized water ("DI water" herein) were placed in a 5-necked, 3 liter round bottom flask equipped with a thermocouple, a cooling condenser and an agitator, and heated to 89° C. under nitrogen. Charged 2.81 g Ammonia Persulfate (APS) in 20 g DI water, and 41.5 g Latex1 in 10 g DI Water into the Kettle. When the temperature was at 86° C., fed Monomer Emulsion and a solution of APS (2.81 g in 50 g DI water) in 105 minutes. When 40% ME was fed, added a solution of DS-4 (13.41 g in 25 g DI water). The polymerization reaction temperature was maintained at 88-90° C. After completing the addition, the vessel that contained the Monomer Emulsion and the feeding pipes leading into the flask were rinsed with 35 g DI water, and the rinse was added back to the flask. Upon completion of the additions the reaction mixture was cooled to 60° C. before gradual addition of solution of t-BHP (70%, 4.43 g)+t-AHP (85%, 1.21 g)+0.2 g DS4 in 34 g DI water and SSF (2.9 g in 41 g water) over 25 minutes, with stirring. Upon completion of the feeds, the reaction was cooled to room temperature. Added Ammonia solution to adjust pH value to 6.5-7.5.

EXAMPLE 2: TESTING PROCEDURES

The water based adhesive and paper were used without any pre-treatment. The adhesive was coated to a release liner in an amount of 18 g/m$^2$ on dry weight basis and dried. The release liner therefore had the resulting adhesive layer thereon. The paper was laminated with the PSA coated release liner in such a manner that the adhesive layer was in contact with the rough side of said paper to give an adhesive laminate.

Performance testing was conducted after the adhesive laminate was conditioned in a controlled environment (22-24° C., 45-55% relative humidity) testing laboratory for at least overnight. Failure mode is reported as below.

A=adhesion failure.
Pt=paper tear.
C=cohesion failure.

In the aging tests, prepared adhesive laminate was put in humidity and temperature oven at 65° C., 80% humidity for 4 days. The laminates were then put in controlled temperature environment for at least overnight.

Loop Tack Test: Samples were tested on stainless steel (SS) or High density polyethylene (HDPE) or low density polyethylene (LDPE) test plates according to FINAT Test Method No. 9.

Shear resistance test: FINAT Test Method No. 8 was used for the shear resistance test. C means cohesion failure and A means adhesion failure. A film of size 2.54 cm (1 inch)×2.54 cm (1 inch) was adhered to a stainless steel (SS) surface. Reported results are the time to failure with 1 kg weight and the failure mode. Test was performed at 23° C.

EXAMPLE 3: RESULTS OF TESTING

The samples were made as described in Example 1, with variations of the monomer and initiator as shown in table 1 below:

TABLE 1

Formulations having varying compositions and their shear test performances

|  | Comparative IC | Inventive I | Comparative IIC | Inventive II | Inventive III | Comparative IIIC |
|---|---|---|---|---|---|---|
| Composition |  |  |  |  |  |  |
| BA | 51.5 | 46.5 | 55.7 | 54 | 54 | 55.7 |
| EHA | 40 | 40 | 43.2 | 40 | 40 | 43.2 |

TABLE 1-continued

Formulations having varying compositions and their shear test performances

|  | Comparative IC | Inventive I | Comparative IIC | Inventive II | Inventive III | Comparative IIIC |
|---|---|---|---|---|---|---|
| MMA | 7.5 | 7.5 | 0 | 0 | 0 | 0 |
| DBI | 0 | 5 | 0 | 5 | 5 | 0 |
| AA | 1 | 1 | 1.1 | 1 | 1 | 1.1 |
| Initiator | APS | APS | APS | NaPS | APS | APS |
| Test Results |  |  |  |  |  |  |
| Loop tack[1] | 12.1 | 13.1 | 10.0 | 12.0 | 14.5 | 16.0 |
| SS | (1.50) A | (2.03) A | (1.55) A | (1.86) A | (2.25) A | (2.48) A |
| Loop tack[2] | 5.3 | 5.9 | 6.0 | 6.2 | 7.0 | 7.0 |
| HDPE | (0.82) A | (0.91) A | (0.93) A | (0.96) A | (1.09) A | (1.09) A |
| Shear[3] | 28 C | 26 C | 9 C | 18 C | 5 C | 2.5 C |

Note
[1] 23° C., units are Newton/cm$^2$ (Newton/inch$^2$); also shown is failure mode Note
[2] 23° C., units are Newton/cm$^2$ (Newton/inch$^2$); also shown is the failure mode Note
[3] SS, 23° C., units are hours; also shown is the failure mode Observations based on Table 3 are as follows. In comparative formulation IC, DBI is 0% while in inventive formulation I the amount of DBI is 5% DBI. The loop tack performance of inventive formulation I is higher than comparative formulation I on steel and HDPE panel while having a similar shear performance. Comparative formulation IIC and inventive formulation III contain the same initiator but different DBI amount. The inventive formulation III contains 5% DBI amount while there is no DBI in comparative formulation IIC. The loop tack performance of inventive formulation III is higher than comparative formulation IIC. Shear performance of inventive formulation III is acceptable but is lower than comparative formulation IIC. In inventive formulation II and inventive formulation III sodium persulfate (NaPS) and ammonium persulphate initiator were used respectively to rebalance the tack/shear balance. The inventive formulation II gives similar HDPE tack and higher loop tack in comparison to comparative formulation IIC. The shear performance of inventive formulation II is higher than comparative formulation IIC. In comparative formulation IIIC, all the cofeed initiator was moved into reactor charge of initiator to rebalance the tack/shear balance. Inventive formulation III gives similar HDPE tack and higher shear performance than comparative formulation IIIC.

EXAMPLE 4: RESULTS OF FURTHER TESTING

TABLE 2

Impact of variable DBI dosage on performance

|  | Comparative IVC | Inventive IV | Inventive V | Inventive VI | Inventive VII |
|---|---|---|---|---|---|
| Composition |  |  |  |  |  |
| BA | 51.5 | 46.5 | 49 | 44 | 41.5 |
| EHA | 40 | 40 | 40 | 40 | 40 |
| MMA | 7.5 | 7.5 | 7.5 | 7.5 | 7.5 |
| DBI | 0 | 5 | 2.5 | 7.5 | 10 |
| AA | 1 | 1 | 1 | 1 | 1 |
| Initiator | APS | APS | APS | APS | APS |
| Test Results |  |  |  |  |  |
| Loop tack[1] | 12.3 | 12.4 | 12.2 | 12.6 | 13.5 |
| SS | (1.91) A | (1.92) A | (1.89) A | (1.95) A | (2.09) A |
| Loop tack[2] | 4.4 | 5 | 4.9 | 5.2 | 5.5 |
| HDPE | (0.68) A | (0.78) A | (0.76) A | (0.81) A | (0.85) A |
| Shear[3] | 87 C | 64 C | 80 C | 62 C | 51 C |

Note
[1] 23° C., units are Newton/cm$^2$ (Newton/inch$^2$); also shown is failure mode Note
[2] 23° C., units are Newton/cm$^2$ (Newton/inch$^2$); also shown is the failure mode Note
[3] SS, 23° C., units are hours; also shown is the failure mode Inventive formulations IV, V, VI, and VII have acceptable level of shear. Also, Inventive formulations IV, V, VI, and VII have level of tack on stainless steel that is comparable to or better than that of comparative formulation IVC. Also, Inventive formulations IV, V, VI, and VII have level of tack on HDPE that is better than that of comparative formulation IVC.

The invention claimed is:

1. An aqueous adhesive composition comprising a polymer that comprises:
   (a) 80% to 95% by weight, based on the dry weight of said polymer, polymerized units of one or more alkyl (meth) acrylate monomer,
   (b) 0.1% to 2.5% by weight, based on the dry weight of said polymer, polymerized units of acrylic acid or methacrylic acid or a mixture thereof,
   (c) 2.0% to 15% by weight, based on the dry weight of said polymer, polymerized units of dibutyl itaconate, and
   (d) 0% to 10% by weight, based on the dry weight of said polymer, polymerized units of one or more other monomer.

2. The composition of claim 1, wherein said polymer has weight-average molecular weight of 70,000 to 300,000.

3. The composition of claim 1, wherein said polymer has glass transition temperature of −30° C. or lower.

4. The composition of claim 1, wherein the polymer comprises (c) 2.5% to 15% by weight, based on the dry weight of said polymer, polymerized units of dibutyl itaconate.

5. The composition of claim 1, wherein the polymer comprises
(c) 5% to 15% by weight, based on the dry weight of said polymer, polymerized units of dibutyl itaconate.

6. The composition of claim 1, wherein the polymer comprises 0% to 0.2% by weight, based on the dry weight of the polymer, of polymerized units of multiethylenically unsaturated monomer.

7. The composition of claim 1, wherein the polymer comprises 0% of polymerized units of multiethylenically unsaturated monomer.

* * * * *